(12) United States Patent
Brailovskiy (10) Patent No.: US 10,489,912 B1
(45) Date of Patent: Nov. 26, 2019

(54) AUTOMATED RECTIFICATION OF STEREO CAMERAS

(71) Applicant: Amazon Technologies, Inc., Reno, NV (US)

(72) Inventor: Ilya Vladimirovich Brailovskiy, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 830 days.

(21) Appl. No.: 14/136,730

(22) Filed: Dec. 20, 2013

(51) Int. Cl.
*G06T 7/00* (2017.01)
*H04N 13/204* (2018.01)

(52) U.S. Cl.
CPC ........... *G06T 7/002* (2013.01); *H04N 13/204* (2018.05)

(58) Field of Classification Search
USPC .................................. 348/47, 48; 347/47, 48
See application file for complete search history.

(56) References Cited

U.S. PATENT DOCUMENTS

| | | | | |
|---|---|---|---|---|
| 5,606,627 A | * | 2/1997 | Kuo | G01C 11/06 382/154 |
| 2003/0156751 A1 | * | 8/2003 | Lee | G06K 9/03 382/154 |
| 2009/0185723 A1 | * | 7/2009 | Kurtz | G06K 9/00288 382/118 |
| 2010/0125816 A1 | * | 5/2010 | Bezos | G06F 1/1626 715/863 |
| 2011/0157373 A1 | * | 6/2011 | Ye | G06T 7/85 348/187 |
| 2012/0275667 A1 | * | 11/2012 | Lu | H04N 13/239 382/118 |
| 2012/0314914 A1 | * | 12/2012 | Karakotsios | G06K 9/00255 382/118 |
| 2013/0113881 A1 | * | 5/2013 | Barnum | H04N 13/0018 348/43 |
| 2014/0270480 A1 | * | 9/2014 | Boardman | G06T 17/00 382/154 |
| 2015/0131852 A1 | * | 5/2015 | Sweetser | G01B 11/14 382/103 |
| 2015/0288874 A1 | * | 10/2015 | Sivan | H04N 5/23222 348/207.11 |

* cited by examiner

*Primary Examiner* — Christopher S Kelley
*Assistant Examiner* — Ana Picon-Feliciano
(74) *Attorney, Agent, or Firm* — Pierce Atwood LLP (57) ABSTRACT

An electronic device can have two or more pairs of cameras capable of performing three-dimensional imaging. In order to provide accurate disparity information, these cameras should be sufficiently rectified. Automatic rectification can be performed by periodically capturing images with a pair of front-facing cameras, and locating matching facial or other feature points in corresponding images captured by those cameras. Small misalignment errors can be treated as linear translations, such that a set of linear equations can be used to solve for the misalignments. Another process can process a set of homographies for the cameras until a cost function converges. Various other approaches can be used as well, such as to directly solve for yaw, pitch, and roll errors. Once this information is obtained, the misalignment values (or related values) can be stored for use in correcting images subsequently captured by those cameras.

22 Claims, 6 Drawing Sheets

AUTOMATED RECTIFICATION OF STEREO CAMERAS

BACKGROUND

People are increasingly interacting with computers and other electronic devices in new and interesting ways. For example, certain devices include stereoscopic cameras that are able to capture stereoscopic images that include disparity information, enabling those images to appear to be three-dimensional when properly rendered. In order for the relative distances of objects in the image to appear correctly, the cameras need to be adequately aligned such that the apparent disparity is accurate for the actual distance of the object, i.e., the optical axes are aligned in yaw, pitch, and roll. When using two distinct cameras, however, it is difficult to perfectly align the lens elements, such that a software adjustment is also required. While a calibration procedure can be used during the manufacture or testing process, it may be difficult to get users to recalibrate the cameras over time. Further, over a period of time as the device is being used, the stereo cameras can get misaligned (due to shocks or natural degradation). Further still, existing calibration approaches require placing specific calibration objects in specific locations and/or orientations, which can be confusing or at least not enjoyable for a user.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for calibrating two or more image capture elements, such as may comprise a stereoscopic camera. In particular, various embodiments enable a computing device including such a camera to automatically perform a recalibration process after the device has left the manufacturer and/or is in the possession of a user, or at another appropriate time. At least some embodiments enable two or more cameras to be aligned through software mechanisms in order to enable the captured stereo images to include a proper amount of disparity or depth information, as well as to have objects aligned in images captured by each camera. Various calibration processes are presented that enable any misalignment between the cameras to be determined, which can then be addressed when processing images captured by those cameras. Such approaches allow for compensation of any misalignment with lower cost and power consumption than conventional approaches.

For example, in at least some embodiments, a computing device with at least two front-facing cameras having at least partially overlapping fields of view can detect the presence of an object, such as a face of a user, facial features of the user, and/or any features represented in stereoscopic image data captured by the front-facing cameras. Portions of at least a first image acquired by a first camera of the stereo camera pair and a second image acquired by a second camera of the stereo camera pair can be analyzed to attempt to identity feature points corresponding to facial features of the user's face. In various embodiments, the facial features identified in the first image and the second image will have an amount of disparity that indicates its apparent distance from the computing device. However, since the cameras can become misaligned through use over time, the disparity information may be inaccurate, resulting in imprecise distance determinations. In order to account for at least some of these misalignments, a location of the identified feature points from the first image can be compared to a location of the identified features points from the second image to generate a mapping between corresponding feature points. The mapping can be used to adjust the calibration of the cameras, such that the face of the user at that distance will have the proper amount of disparity in a subsequently captured stereoscopic image. In order to improve the calibration, additional cameras can be used and/or the facial features (or multiple facial features) can be imaged at multiple locations (or in motion) in order to improve calibration over a range of distances. In accordance with various embodiments, such an approach provides various advantages, including reduced power consumption and calibration processes that require less processing capacity while still providing sufficient calibration of any misaligned cameras.

Various other functions and advantages are described and suggested below as may be provided in accordance with the various embodiments.

Figure 1A:
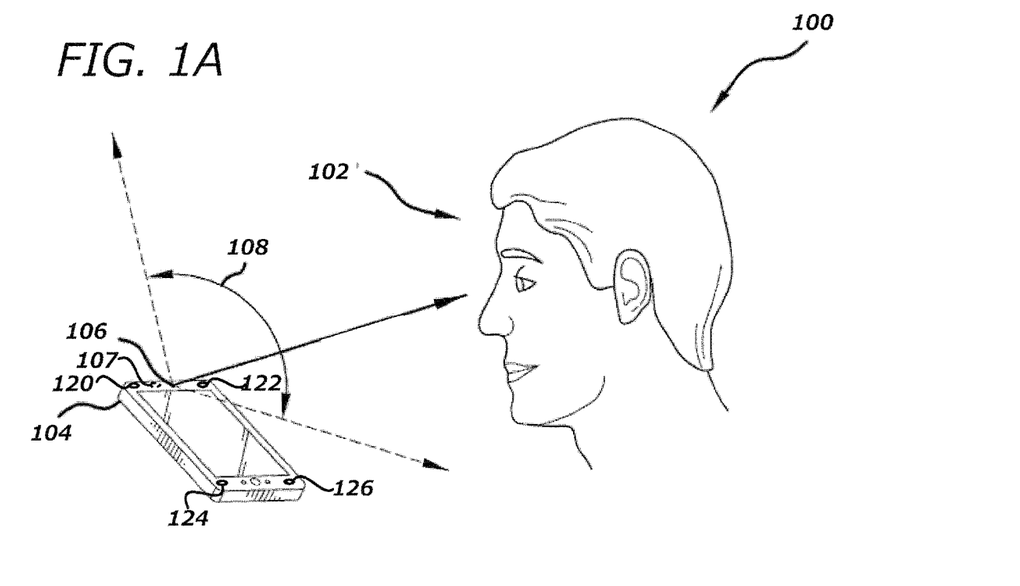
FIGS. 1A and 1B illustrate an example situation wherein a computing device using a pair of misaligned front-facing cameras is capturing an image of a user in accordance with various embodiments.

FIG. 1A illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera 106 positioned on a front, side, or corner of the device such that the camera will likely be able to capture image information of at least a portion of the user while the user is viewing content displayed on the device.

For example, the camera 106 in FIG. 1 is on the front of the device such that an angular capture range 108 of the camera can image at least a portion of the user while the viewer is viewing content displayed on the display element of the electronic device. In accordance with the illustrated embodiment, the device further includes a rear-facing camera 107 and four corner cameras (120, 122, 124, 126) also located on the front of the device. These cameras can be used to acquire images and the image information for each image can be used by the device to determine a relative position and/or orientation of the user with respect to the device. Such image information can also be used for object recognition, object tracking, or various other purposes such as various calibration processes that can be used to adjust for any misalignment between the cameras.

It should be understood, however, that there can be additional and/or alternative cameras placed in similar or alternative locations in accordance with various embodiments, and that information from any or all of these cameras can be analyzed as appropriate. For example, a computing device might have a high resolution still camera that is able to capture images useful for performing facial recognition, and might have a lower resolution video camera that can be useful for performing object detection. In other embodiments, a single camera might be used to capture image information for both types of analysis, while still other embodiments might utilize stereo cameras or other elements to determine distance information or perform three dimensional modeling, among other such aspects. As mentioned, some devices might have digital still cameras that are able to capture single images at specific points in time, or digital video cameras that are able to continuously capture image information, which can be referred to as a set of frames in at least some embodiments. Also, for a process such as image recognition to be relatively accurate, the image being analyzed may have to meet some minimum criteria. This can include, for example, adequate lighting and contrast, but can also include factors such as quality of focus and spatial resolution. Accordingly, a device can include additional elements as well, such as illumination elements and focusing optics as discussed elsewhere herein. Each imaging element may be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology.

As mentioned, the device can include stereo cameras on the front or back of the device to perform stereoscopic or three-dimensional (3D) imaging. These cameras are separated a distance sufficient to enable stereoscopic imaging over at least a determined distance, each with a determined field of view that at least partially overlaps. In some embodiments the stereo cameras each come with auto-focusing mechanisms, enabling the cameras to focus to different depths. When capturing a stereoscopic ("stereo") image, each of the pair of cameras captures an image at approximately the same time. The offset of the cameras will cause the location of objects in each image to be slightly offset, where the amount of offset is a factor of the separation of the cameras and the distance from the cameras to the objects. This varying offset with distance, otherwise known as disparity, provides the perception of depth in the image when the images are combined using a stereovision process. It should be understood that a stereo image can be a combined image or can include a rendering of separate images captured by each of the stereo cameras in different embodiments.

Figure 1B:
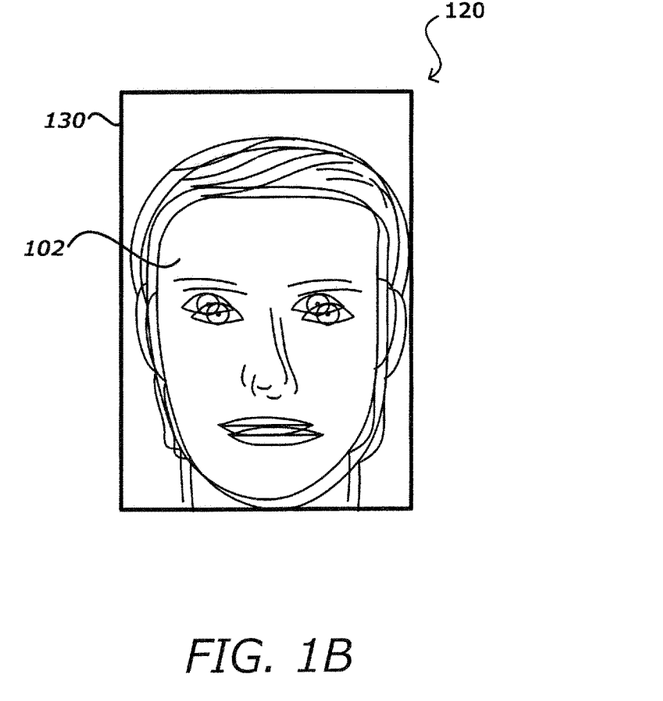

As illustrated in the example situation 120 of FIG. 1B, the portable computing device 104 using at least a pair of front-facing stereo cameras (e.g., camera 120 and 122) can be used to capture an image (or video) 130 that includes a representation of the user 102 of the device. The user holding the device can view the stereo image 130 being captured, assuming the display is capable of rendering the stereo information for a two- or three-dimensional display. The user thus can view a three-dimensional view of the view of themselves as captured by the cameras and displayed on the display screen. As described above, in order for the image of the object to have the desired appearance in the captured stereo image, the cameras have to be aligned such that the object is properly positioned in each image to provide the desired depth information. It may be the case, however, that there is some amount of misalignment of at least one of those cameras. For example, stereo image 130 illustrates an overlay of images from the horizontally offset cameras (e.g., cameras 120 and 122). In this example, however, there is additional offset along the x-axis, which can affect the apparent distance to the user in the three-dimensional image. This movement along the x-axis can be thought of as rotation along the y-axis, or "yaw" as it is often referred. Similarly, there can be an offset along the y-axis, due to misalignment of at least one of the cameras. This offset along the y-axis can be attributed to rotation along the x-axis, or "pitch." As previously stated, for horizontally offset cameras, such as cameras 120 and 122, there should be no appreciable offset along the y-axis. Further, there can be an offset along the x-axis and an offset along the y-axis, due to misalignment of at least one of the cameras. The combined offsets could be a translation in the x/y plane, and thus might be addresses as a combination of the previous two offsets. In this situation, however, the offset changes for each feature point in the image, as the misalignment results in a rotation of the image. This rotation along the z-axis is often referred to as "roll."

As mentioned, the cameras can be aligned mechanically to the extent possible and/or practical. However, there may be at least some misalignment such that it can be desirable to compensate for the misalignment through software and/or image processing. A static approach can use a calibration object, such as the calibration grid to enable points to be located in an image captured by each camera, or some other static calibration approach. However, a potential problem with using a static calibration approach is that such a calibration object may not always be available and/or such a process is confusing and/or at least not enjoyable for a user. Further, analyzing full color, high resolution images from one or more cameras to determine complex features can be very processor, resource, and power intensive, particularly for mobile devices.

Accordingly, in accordance with various embodiments, online (or real-time) software and/or image processing can be used to provide a relatively low power but robust calibration approach to compensate for any misalignment between cameras on the device, without the use of such dedicated calibration objects or user interaction. Accordingly, one or more calibration/rectification approaches, such as one involving the use of facial features as a non-rigid calibration object can be automatically performed to compensate for at least some misalignment between the cameras. In such approaches, one or more (in some cases preferably two) features (e.g., facial features) can be used to reliable compute calibration parameters that can be used to compensate for any misalignment between the cameras.

Figure 2A:
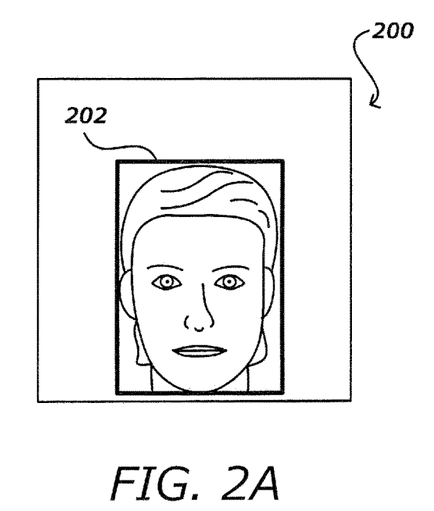
FIGS. 2A, 2B, 2C, and 2D illustrate examples of head location and feature locations that can be determined from a captured image that can be leveraged for rectifying or otherwise accounting for variations in images captured by a pair of stereo cameras in accordance with various embodiments.

As illustrated in FIG. 2A, at least some embodiments utilizes a face or head detection algorithm as discussed above to attempt to locate an approximate head or face position 202 in a captured image or video frame 200. In some embodiments, a computing device might utilize one or more motion sensors, such as an electronic gyroscope or inertial sensor, to attempt to assist with location determinations. For example, a rotation of a device can cause a rapid shift in objects represented in an image, such that image stabilization might not be attempted if the amount of motion exceeds a determined amount. For smaller movements, the information from the motion sensors can be used to provide a starting point for the feature detection in a subsequent image, which can increase the speed of the detection process and reduce the amount of processing and power required. Various other types of movement or motion information can be used as well within the scope of the various embodiments.

Figure 2B:
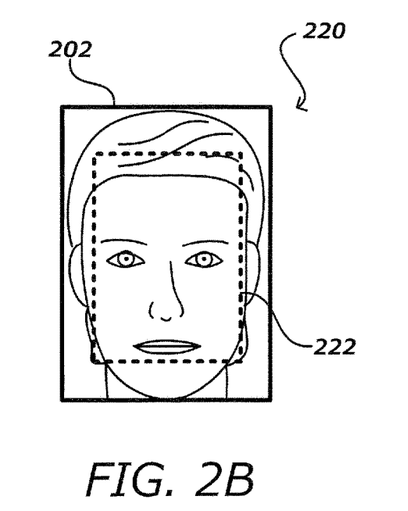

In approaches that attempt to calibrate for any misalignment between cameras of a computing device based at least in part on facial feature of a user using the device, it can improve results in at least some embodiments to sufficiently isolate the person's face, such that variations in the background of the image do not create false positives (or false negatives in some instances). As illustrated in the isolated image portion 220 of FIG. 2B, in some embodiments, an algorithm can analyze only a central portion or region 222 of the determined head position 202, in order to attempt to include primarily facial area and not hair or areas just outside the face region due to differences between the actual shape of the user's face and the shape of the bounding box 202 or other such boundary.

Figure 2C:
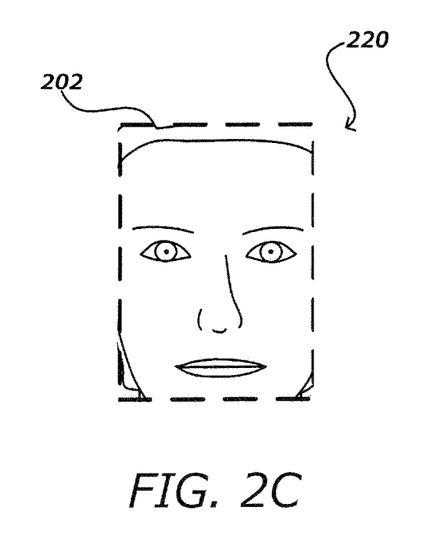

Once the facial region to be analyzed is determined, and tracked or updated over time in the video information, one or more head or face detection algorithms can be used to features of the user's face. For example, FIG. 2C illustrates an example situation where a head or face detection algorithm has been used to attempt to locate a portion of the image 220 that corresponds to the approximate facial features of the user's face. The head or face detection algorithm can include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. The ability to locate the head position in an image can reduce the amount of resources otherwise needed to perform facial recognition, as the analysis can be performed only on the portion of the image corresponding to the head position. Further, in some embodiments facial recognition might not be performed unless a head or face can first be detected in the captured image.

Figure 2D:
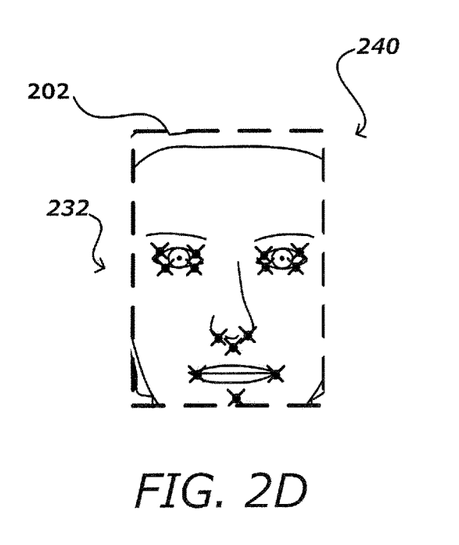

In this example, the detected head portion can be analyzed using one or more facial recognition algorithms to attempt to identify facial features of the person represented in the image. As illustrated in example 240 of FIG. 2D, this can include identifying unique or distinguishing points 232, facial marks, geometric shapes or distances, or other such features on the face. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others. The image should be of sufficient resolution, clarity, and focus, for example, enabling the algorithms to adequately match the image to information stored for the user. As known, a facial recognition algorithm can take an amount of time to analyze an image, such that other processes can be executed during the analysis.

Figure 3:
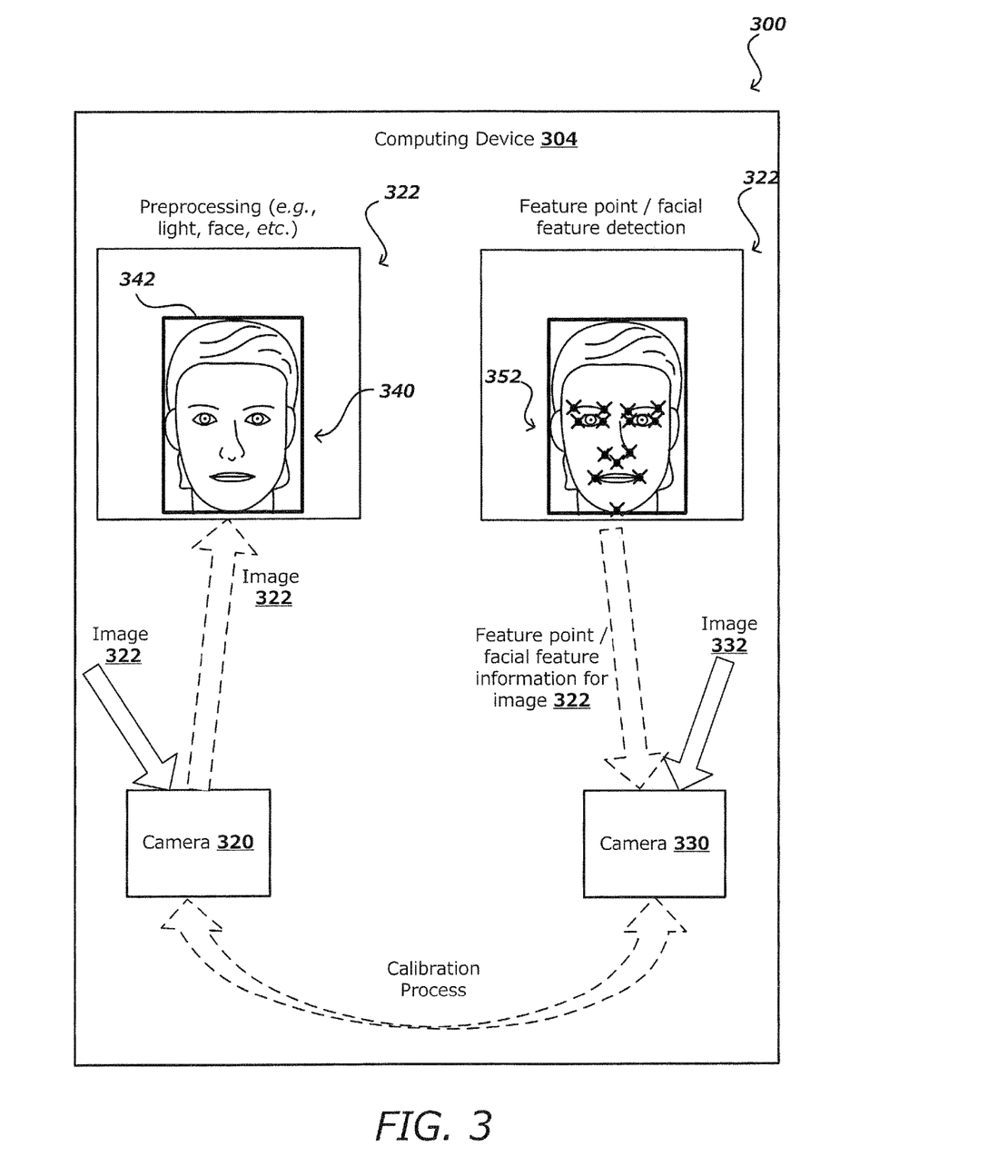
FIG. 3 illustrates an example implementation for rectifying or otherwise accounting for variations in images captured by a pair of stereo cameras in accordance with various embodiments.

As described, the identified facial features can be used in various calibration processes to enable any misalignment between the cameras to be determined, which can then be addressed when processing images captured by those cameras. For example, FIG. 3 illustrates an example situation 300 of at least one calibration process to enable misalignment between cameras to be determined. As described above, in order for the images to combine to form an accurate three-dimensional image, the cameras used to capture the component images should be sufficiently aligned and/or rectified to represent the correct amount of disparity. Misalignments along the direction of the offset can cause objects to have an incorrect amount of disparity, which can affect the apparent depth or distance to the object. Misalignments in other directions can cause various potential problems, such as problems with processing computer vision algorithms, problems with objects being blurry or otherwise improperly rendered when the component images are combined for the three-dimensional image, etc. Accordingly, it can be desired to account for, and remove, any effects of the misalignment of the cameras. As mentioned, cameras can be increasingly misaligned over time, due to factors such as impact or shock to the device, natural degradation (e.g., due to temperature and/or humidity), vibration over time, mechanical wear or failure, and other such causes.

Conventional camera calibration algorithms use some sort of patterns like checkerboards, patterns, and/or various other external objects and users explicitly initiate the calibration process. However, this is not a desired user experience and can be desirable to enable a computing device or electronic device including the cameras to be able to automatically rectify the stereo cameras without manual intervention by the user, although manual intervention or triggering can be used in some embodiments. It also can be desirable to enable the rectifying to be done without the need for a calibration object or other such item.

Accordingly, various embodiments enable a computing device to automatically perform a recalibration process after the device has left the manufacturer and/or is in the possession of a user. The rectifying can be performed at any appropriate time, such as at regular intervals, at random times, or in response to detected events, such as rapid movements or force as detected by a motion sensor or other component of the device. In various embodiments, the automatic calibration process can be performed upon detecting incontinences in images acquired from any number of stereoscopic pair of cameras. This can include, for example, using one or more algorithms to detect that images captured using a pair of stereoscopic cameras appears blurry, distorted, or otherwise out of focus. Where there are multiple pairs of stereo cameras on a device, different combinations of the cameras can be used to improve the rectification of each camera.

In accordance with various embodiments, calibrating one or more cameras of a computing device can include estimating or otherwise determining camera parameters of each of the cameras and adjusting those camera parameters to compensate for any misalignment of those cameras. In accordance with various embodiments, a transformation matrix M can be used to model the camera parameters for any particular camera, where the transformation matrix can be illustrated as:

$$\begin{pmatrix} u \\ v \\ 1 \end{pmatrix} = A[R \ T] \begin{pmatrix} x_w \\ y_w \\ z_w \\ 1 \end{pmatrix}$$

In the above transformation matrix, the camera parameters can be A, R, and T and can be representative of such camera parameters as focal length, principal points, lens distortions, as well as other intrinsic and/or non-linear camera parameters. Variables R and T can be representative of extrinsic camera parameters which can correspond to coordinate system transformation matrixes from three-dimensional (3D) space coordinates to 3D camera coordinates. As shown in example 300 of FIG. 3, a computing device 304 with at least two front-facing cameras (e.g., cameras 320 and 330) having at least partially overlapping fields of view can detect the presence of an object, such as a face of a user, represented in stereoscopic image data captured by the front-facing cameras. It should be noted that although two cameras are shown, embodiments described herein are not limited to such an arrangement, and those skilled in the art will appreciate that more or fewer cameras can be used. It should be further noted, that although features of a user's face are detected and used in such calibration approaches, any object or features a known or approximated distance from the device can be used in the various approaches described herein. These objects can include a hat the user is wearing, sunglasses, clothing, text on the clothing, jewelry, among other objects that can be detected on and/or proximate to the user. In at least some embodiments, the object must exhibit one or more other properties than being closest to the camera in order to be selected. For example, the object might have to be within a specified distance range, such as a range that is not too close to the camera or too far from the camera. If an object is detected that is less than a foot away from a camera, for example, and thus would not be able to be brought into focus for some cameras, that object might not be selected as an intended foreground object. Similarly, if the object is far enough away that the disparity will not be appreciably different from the background images, that object might not be selected as a foreground image. The object might also potentially have to be in or near a central region of the image. Upon detecting the object, one or more feature points of the detected object(s) can be used to calibrate at least the front facing cameras of the device in accordance with the various approaches described herein. In various embodiments, the distance between the object and device can be estimated, for example, to be around the length of a human's arm, or determined, for example, using one or more sensors or cameras of the computing device. For example, distance information can be obtained using ultrasonic sensors, infrared flash intensity analysis, and other such relevant distance-determining techniques.

Portions of at least a first image 322 acquired by camera 320 of the stereo camera pair and a second image 332 acquired by camera 330 of the stereo camera pair can be analyzed to attempt to identity feature points corresponding to facial features of the user's face. In various embodiments, the images can be acquired concurrently while in various other embodiments there may be some level of delay between acquiring the images by the two cameras. In various embodiments, prior to analyzing the images, a number of checks or preprocessing approaches can be performed to determine whether the pair of images are optimal candidates for use in one or more calibration processes. In one example, a preprocessing approach can include determining whether the images include at least a threshold amount of light. Determining whether the images include the threshold amount of light can include determining image statistics such as a level of gain, an average level of light, and/or a histogram representative of a level of light, and comparing at least one of those statistics to a corresponding threshold. For example, in the situation where at least one of the level of gain, the average level of light, or the histogram representative of the level of light at least meet a threshold amount, it can be determined that there is a sufficient level of light in the images. In another example, a preprocessing approach can include determining whether a level of ambient light meets a threshold amount of ambient light.

In response to determining that there is at least a threshold amount of light, additional preprocessing approaches can be performed. One such approach can include determining whether there is at least a portion of a face in each image of the pair of images. This can be determined using one or more face detection algorithms.

If at least a portion of a representation of the user's face is detected in each image of the pair of images, one or more facial features can be determined. In certain embodiments, specially trained Harr classifiers or other like classifiers can be used to detect the facial features. It should be noted that any number of algorithms can be used, as known to those skilled in the art. In various embodiments, the facial features can include at least one of an eye, mouth, nose, among other facial features. The number of detected facial features can be compared to a threshold number of facial features (e.g., 15 different facial features). In certain embodiments, the number of detected facial features is below the threshold number, for example, because the user's face is occluded due to the user wearing a hat, sunglasses, etc., one or more other features can be determined using at least one of a speeded up robust features (SURF), scale-invariant feature transform (SIFT), or binary robust invariant scalable keypoints (BRISK) algorithms to determine matching features points in the images captured by the two cameras. As described, the objects detected are within a determined distance to the computing device. However, as discussed above, stereo imaging might not be available on all devices, or may not be sufficient for all conditions. For example, stereo imaging typically requires a minimum amount of contrast in order to be able to correlate the objects in the images captured from each camera. Accordingly, approaches in accordance with various embodiments can utilize different approaches, and/or a combination of approaches, to provide distance determinations useful in detecting an object within the determined distance. For example, a computing device might use a light sensor or other such component to determine an amount of light and/or image contrast near the computing device. If a sufficient amount of contrast is present, the device can utilize a stereo imaging approach. If there is not a sufficient amount of contrast, however, the device can attempt to use an alternative (or additional) approach to making distance determinations. If stereo imaging is not available, the device might instead rely on such an approach.

For example, a device can utilize infrared radiation (IR) to attempt to detect an object within the determined distance in at least some embodiments, where the device can capture one image while emitting IR radiation and another image without IR radiation. Objects within the correct distance will show stronger differences as a result of the illumination between figures, which can facilitate the identification of foreground objects. In other embodiments, a single image can be captured and the relative brightness of objects used to separate objects into foreground and background objects or regions, although a single image may not be as reliable as intensity differences can also vary based on color, surface texture, reflectivity, and other such factors. Multi-image based IR-based approaches can suffer from motion effects, however, as the images are captured at different points in time. Stereo imaging captures image information at the same time, such that there is little to no effect due to motion, other than blur or other such effects. IR-based approaches can produce relatively crisp images, even when there is an amount of motion, but do not work well in bright sunlight, where stereo imaging tends to perform well. IR-based approaches work well up to thirty centimeters, for example, but stereo approaches work for longer distances, such as up to three meters, but have blind zones when very close to the device. Stereo and IR based approaches thus complement each other, and can be used together advantageously in at least some embodiments for at least a certain range of conditions. Thus, a device can attempt to determine one or more environmental conditions, such as an amount of light or motion, and can select to use a stereo based approach or an IR based approach, or a combination of both. An advantage to using a combination of approaches is that each individual approach might only give a result with 80% confidence, but using them together can result in a confidence of about 96% in at least some embodiments.

In at least some embodiments, an ultrasonic sensor or other distance determining sensor can be used to attempt to determine relative distances to objects represented in an image. Using such an approach, the differences in time-of-flight, as known for distance determinations, can be used to determine relative, if not absolute, differences in distance. Such approaches can also be used to determine or identify objects within at least the predetermined distance. Various other distance determining approaches can be utilized as well within the scope of the various embodiments.

In some embodiments, a computing device might utilize one or more motion sensors, such as an electronic gyroscope or inertial sensor, to attempt to assist with location determinations. For example, a rotation of a device can cause a rapid shift in objects represented in an image, such that image stabilization might not be attempted if the amount of motion exceeds a determined amount. For smaller movements, the information from the motion sensors can be used to provide a starting point for the feature detection in a subsequent image, which can increase the speed of the detection process and reduce the amount of processing and power required. Various other types of movement or motion information can be used as well within the scope of the various embodiments.

Accordingly, any one of these or other related approaches can be used to attempt to identify an object within a predetermined distance based on one or more sources of distance information, and analyze the portions of the images (including frames or portions of video) to attempt to identify one or more feature points from the representation of the object(s) in the images. Once the object(s) have been located, feature points for the objects can be determined, and the feature points can be used in various calibration processes, such as one using the computation of the fundamental matrix, to enable any misalignment between cameras to be determined, which can then be addressed when processing images captured by those cameras, as described above.

For example, as shown in FIG. 3, in response to identifying a representation of the user's face 340 in the image 322, an approximate region 342 or location on the user's face can be identified. This region can be represented by a shape, a bounding box, and the like. A set of feature points can be determined. The feature points 352, image points, or other such features of each image can be determined using one or more feature detection algorithms, as may recognize unique features or shapes, among other such features, that can be recognized in each image. For example, when this image is provided to a feature point recognition algorithm, or other such process, a unique feature point such the tip of the user's nose can be located in each image. As known for such purposes, the feature can be located due to the presence of a transition point, recognized pattern, abrupt change in color or intensity, or other such aspect of the image at that location. In accordance with various embodiments, the set of feature points can include the corners or intersections of the face, areas of the face, or features of the face, which can be extracted by a corner detection algorithm, such as a Harris corners detection algorithm. In at least some embodiments, feature points for the face or features of the face can be determined as is known for object tracking. In some embodiments, face or other well-known detectors can be used to detect feature points of the face represented in the images. In any situation, the features can be any object where one or more points ("feature points") can be used to distinguish each object from other objects in the image.

Once a particular feature point is located in image 342, the relative position of that point in the image 342 can be analyzed and compared to the relative position in image 332 captured by camera 330. In various embodiments, the feature points can be detected in the same portions of the image, only in a different locations (e.g., as a consequence of the spacing of the cameras). These feature points can be matched or other mapped to one another by rotation invariant feature point detectors (such as SIFT, SURF, etc.). Thus, each pair of stereo images generates feature point matches in different portions of the image (even though the features are typically from the same regions of the scene). It should be further noted that any approach that can determine the relationship between corresponding image points can be used in the embodiments described herein.

In various embodiments, a number of approaches can be used to calibrate the camera pair using the matched or mapped feature points and/or facial features obtained from the user's face. For example, in one such approach, using the previous camera calibration parameters mentioned above (e.g., A, T and R), reverse point matching can be performed. In accordance with various embodiments, reverse point matching includes identifying corresponding facial features represented in image 322 acquired by camera 320 to facial features represented in image 332 acquired by camera 330. In the situation where the cameras are perfectly aligned, the feature points representative of a facial feature from image 322 correspond to feature points representative of a corresponding facial feature from image 332. For example, for perfectly aligned cameras, such as cameras with perfectly aligned optical axes, the locations of objects imaged by the cameras will appear on the same scan line, but with an offset along the scan line (generally) due to the offset. For example, stereo imaging applications involve the generation and analysis of at least two images of an object from different points of view. Typically, the two images correspond to left and right images generated by cameras positioned along, and orthogonal to, at least two viewpoints on a horizontal axis. Collectively, the left and right images are called a stereo image pair. The left and right images of a stereo image pair may be analyzed to yield disparity data. Disparity is the amount of translation along a conceptual epipolar axis that all objects move along in response to changing the image creation viewpoint. If the cameras are perfectly aligned, both vertically and rotationally, the epipolar axis is identical to the horizontal axis. That is, the corresponding epipolar lines coincide and become parallel to the x-axis of the image.

Misalignments in directions other than the offset direction are relatively easy to detect by comparing the location of various object points or features to determine whether those features are on different scan lines. Any change in the offset in a direction other than the camera offset can be indicative of an impact event or other occurrence which caused misalignment of the cameras. Misalignment information indicative of a misalignment between the cameras can be stored. In this way, a historical buffer of misalignment information can be determined. Once a predetermined amount of misalignment information is obtained, the calibration algorithm can initiate at least one optimization approach correct for any misalignment between the cameras using the determined calibration parameters (e.g., A, T, and R). In accordance with various embodiments, an optimization approach can include at least one of gradient descent search and/or variational or stochastic methods. When calibration parameters are determined that at least meet a predetermined confidence or threshold, those parameters are stored and replace the current parameters A, T and R.

In another such approach, upon detecting the feature points in each face, e.g., by using one of a number of detection algorithms, such as scale-invariant feature transform (SIFT), speeded up robust features (SURF), among others, a calibration matrix or other such computation can be computed using one of, or a combination of, normalized 8-point method, random sample consensus (RANSAC), least median squares, among others. There are many approaches known and/or used for computing a calibration matrix or other such computation, such that details of such a computation will not be discussed herein in detail. It should be further noted that any approach that can determine the relationship between corresponding image points can be used in the embodiments described herein. Additionally, it should be understood that detecting the user's face and facial features can occur over multiple frames, and is not limited to one frame.

The computation of the calibration matrix can then be used to represent the relationship between feature points in the stereo images (e.g., images 322 and 332), where the features are projections of the same object element. Given a feature point in one image, its corresponding point must lie on an epipolar line in the other image, allowing for the detection of incorrect correspondences. In this way, when the epipolar geometry is not in this ideal form, the image pairs can be adjusted to make corresponding points lie on the same scan lines. This process is known as image rectification, and can be accomplished by applying 2-D projective transformations on each image. For example, offset values for the feature points can be determined, and in at least some embodiments, a model (e.g., a "rectifying model") of the camera(s) capturing that image can be generated. The rectifying model or mappings can include transforms or adjustments to be made to an image captured by one or both of the cameras in order to reduce misalignment. For example, based at least in part upon the model or mappings, the appropriate image adjustments can be made to align the pair of cameras (e.g., images 322 and 332). For example, each point on a grid can be located in an image captured by each camera, and an offset or function determined for matching these locations in the image, with respect to the expected amount of disparity between the images for the location of the calibration object. Further, in some embodiments, an overall adjustment such as an amount of translation and/or rotation can be determined that should be applied to an image captured by at least one of the cameras. For example, if one of the cameras is determined to be angled at 0.5 degrees with respect to the other camera, images captured by one of the cameras can be rotated by 0.5 degrees to align the images. Similarly, if there is a determined translation or offset in terms of pixel values, distances, etc., at least one of the images can be shifted to compensate for the offset. Upon computing the calibration matrix, and once a subsequent stereoscopic image is captured using the pair of cameras, the model obtained therefrom can be applied to each image to account for misalignment effects due to the misaligned stereo camera pair before providing the stereoscopic image for display. For example, upon applying the model or mapping to a subsequently captured image can account for, or remove, the offset due to the misaligned cameras.

In another approach, for small errors, misalignments of any or all the cameras can be treated as linear translations in the images. Accordingly, a set of linear equations can be used to solve for the misalignments of each camera, as determined by the coordinates of the located feature points. In other embodiments, a set of homographies can be determined for the cameras using the coordinates of the feature points. By iterating over the homographies until a cost function converges, a misalignment amount can be determined, and the misalignment amount of the cameras can be solved together. Other approaches can be used as well, such as to attempt to directly solve for yaw, pitch, and roll errors.

Figure 4:
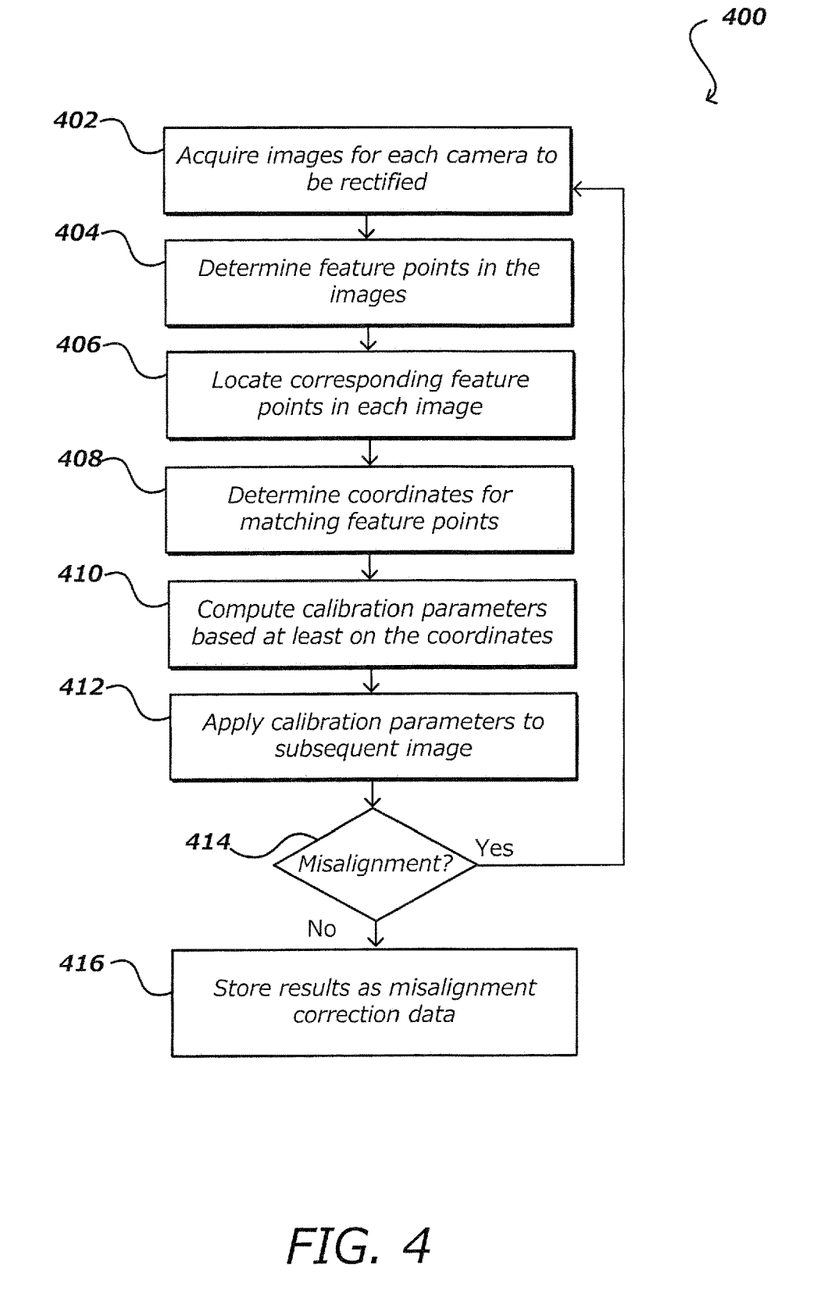
FIG. 4 illustrates an example process for rectifying or otherwise accounting for variations in images captured by a pair of stereo cameras in accordance with various embodiments.

FIG. 4 illustrates an example process 400 for calibrating two or more cameras of a computing device that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. Further, the entire process can be performed on a single device in some embodiments, while at least portions of the process can be performed using one or more other computing devices, such as a remote server, in accordance with various embodiments. In this example, stereoscopic data (images and/or video) and proximity data can be captured concurrently, as may include capturing such data as close to simultaneously as possible or otherwise captured such that there is a sufficiently high likelihood that the fields of view experience minimal changes during the time between the capturing of each image (e.g., less than 100 milliseconds), in order to reduce the effects of motion of an object or the computing device on the distance determinations. For example, images can be simultaneously and/or concurrently captured 402 using each camera to be rectified. As discussed, this can include two or more pairs of cameras arranged in a pattern, such as a rectangle or regular array, such that different pairs of the cameras can be used to perform three-dimensional imaging, and the pairs can be selected in at least two different directions, which in at least some embodiments are orthogonal directions. Also, as discussed elsewhere herein, in at least some embodiments all cameras of interest do not have to capture a respective image at substantially the same time, but at least pairs of cameras to be rectified should capture images at substantially the same time. In various embodiments, a number of images captured and processed to account for any misalignment between the cameras can be based on a desired level of alignment accuracy, wherein a first amount of images captured and processed greater than a predetermined number can result in a first level of accuracy and a second amount of images captured and processed less than the predetermined number of images can result in a second level of accuracy. In some situations the first level of accuracy can be greater than then second level of accuracy. Further, there can be more or fewer than two levels of accuracy, such as one, three, or more. Further still, the level of accuracy need not depend on the number of captured and processed images and can be based on other factors, such as the quality of the captured images, a number of detected features, etc.

In any situation, each captured image can be analyzed to determine 404 one or more of feature points, image points, or other such features using one or more feature detection algorithms, as may recognize unique features or shapes, among other such features, that can be recognized in each image. This can include, for example, detecting the user's head, face, and/or facial features. In various embodiments, as known for such purposes, feature points can be determined using algorithms such as feature detection algorithms (e.g., SIFT or SURF), corner finding algorithms, pattern matching algorithms, contour detection algorithms, and the like. For this example, the process uses a facial feature detection algorithm to locate specific points in each image corresponding to facial features. Corresponding feature points can then be located 406 in each of the captured images, to the extent those feature points are represented in each of those images.

Thus, a feature point corresponding to an object represented in an image captured by four cameras will have four pairs of coordinates, with an (x,y) or other such pair of coordinates representing the location of that feature point in each image. As discussed elsewhere herein, the examples utilize a single feature point for purposes of explanation, but it should be understood that multiple feature points will generally be analyzed and/or otherwise utilized in various analyses within the scope of the various embodiments. Once the feature points are detected, the coordinates of those feature points in each image can be determined 408. For purposes of explanation, each feature point in an image captured by camera #1 (120 in the example of FIG. 1A) will have representative coordinates of $(x_1, y_1)$, each corresponding feature point in an image captured by camera #2 (122 in the example of FIG. 1A) will have representative coordinates of $(x_2, y_2)$, etc.

In various other embodiments, the coordinates from the images (e.g., three or more feature point coordinates) can be used in a number of calibration approaches to determine at least one set of calibration parameters 410, where the calibration parameters can include lateral offset amounts for small angles. In other cases, the calibration parameters can include misalignments in roll, pitch, and/or yaw for any or all of the cameras analyzed, such that disparity can be corrected for subsequent images. In one such approach using the previous camera calibration parameters mentioned above (e.g., A, T and R), reverse point matching can be performed. In another such approach, upon detecting the feature points in each face, e.g., by using one of a number of detection algorithms, such as scale-invariant feature transform (SIFT), speeded up robust features (SURF), among others, a calibration matrix or other such computation can be computed using one of, or a combination of, normalized 8-point method, random sample consensus (RANSAC), least median squares, among others. The computation of the calibration matrix can then be used to represent the relationship between feature points in the stereo images, where the features are projections of the same object element. This process is known as image rectification, and can be accomplished by applying 2-D projective transformations on each image. For example, offset values for the feature points can be determined, and in at least some embodiments, a model (e.g., a "rectifying model") of the camera(s) capturing that image can be generated. The rectifying model or mappings can include transforms or adjustments to be made to an image captured by one or both of the cameras in order to reduce misalignment. For example, based at least in part upon the model or mappings, the appropriate image adjustments can be made to align the pair of cameras (e.g., the left and right stereo cameras). For example, each point on a grid can be located in an image captured by each camera, and an offset or function determined for matching these locations in the image, with respect to the expected amount of disparity between the images for the location of the calibration object. Further, in some embodiments, an overall adjustment such as an amount of translation and/or rotation can be determined that should be applied to an image captured by at least one of the cameras.

The model and/or calibration parameters can be applied 412 to subsequent images, where applying the model or calibration parameters to a subsequently captured image can account for, or remove, the offset due to the misaligned cameras. Subsequent images captured by the stereo camera pair can be analyzed to determine whether the model or calibration parameters removed the offset due to the misalignment. When it is determined 414 that the cameras are aligned to at least a threshold level, the results (e.g., calibration parameters) then can be stored 416 as misalignment corrections to be applied to images captured by each of the cameras. Various other types of correction or misalignment data can be stored as well within the scope of the various embodiments. If a device has a mechanical mechanism for realigning the cameras, this information can alternatively be provided to the mechanism instead of being stored for future image adjustments. In embodiments where the misalignments are relative, the values stored can be normalized and/or adjusted such that the minimum average amount of adjustment is applied to each camera while still accounting for misalignment.

When it is determined that the cameras are misaligned, or aligned less than the threshold level, the process can repeat. As discussed, the process can be repeated at relatively regular and/or short intervals, or at other appropriate times, in order to ensure that the cameras are relatively aligned and that any misalignment errors are small. The ability to periodically detect and solve for small misalignments in yaw, pitch, and/or roll misalignment errors enables the calibration parameters to be updated and applied over time in order to maintain acceptable stereo rectification.

Figure 5:
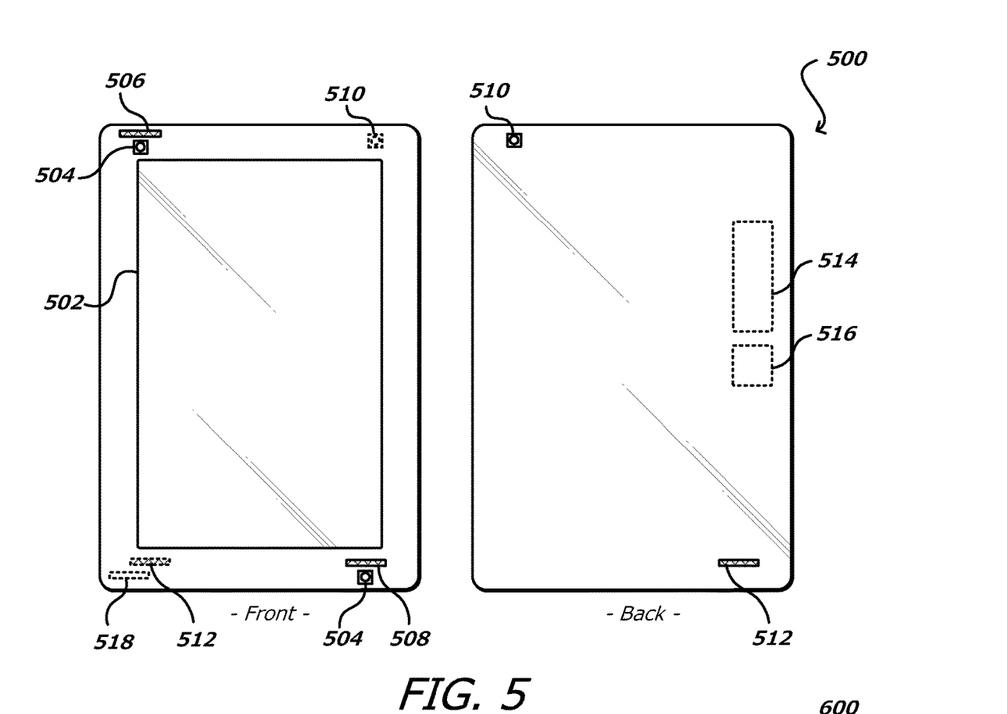
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled component (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such component. Various other elements and/or combinations are possible as well within the scope of various embodiments.

Figure 6:
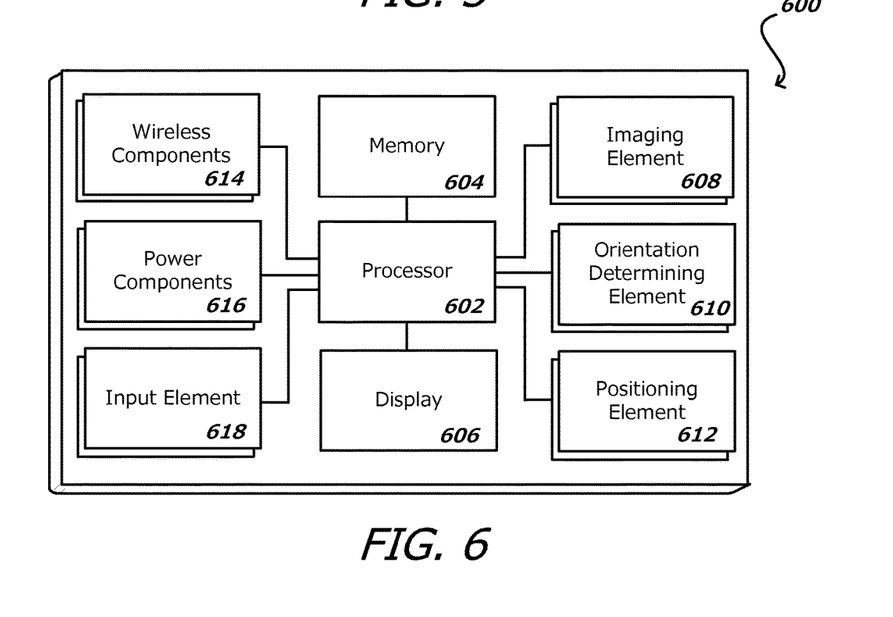
FIG. 6 illustrates an example set of basic components of a portable computing device, such as the device described with respect to FIG. 5.

FIG. 6 illustrates a set of basic components of an electronic computing device 500 such as the device 600 described with respect to FIG. 5. In this example, the device includes at least one processing unit 602 for executing instructions that can be stored in a memory component or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device.

The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination. As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 618 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
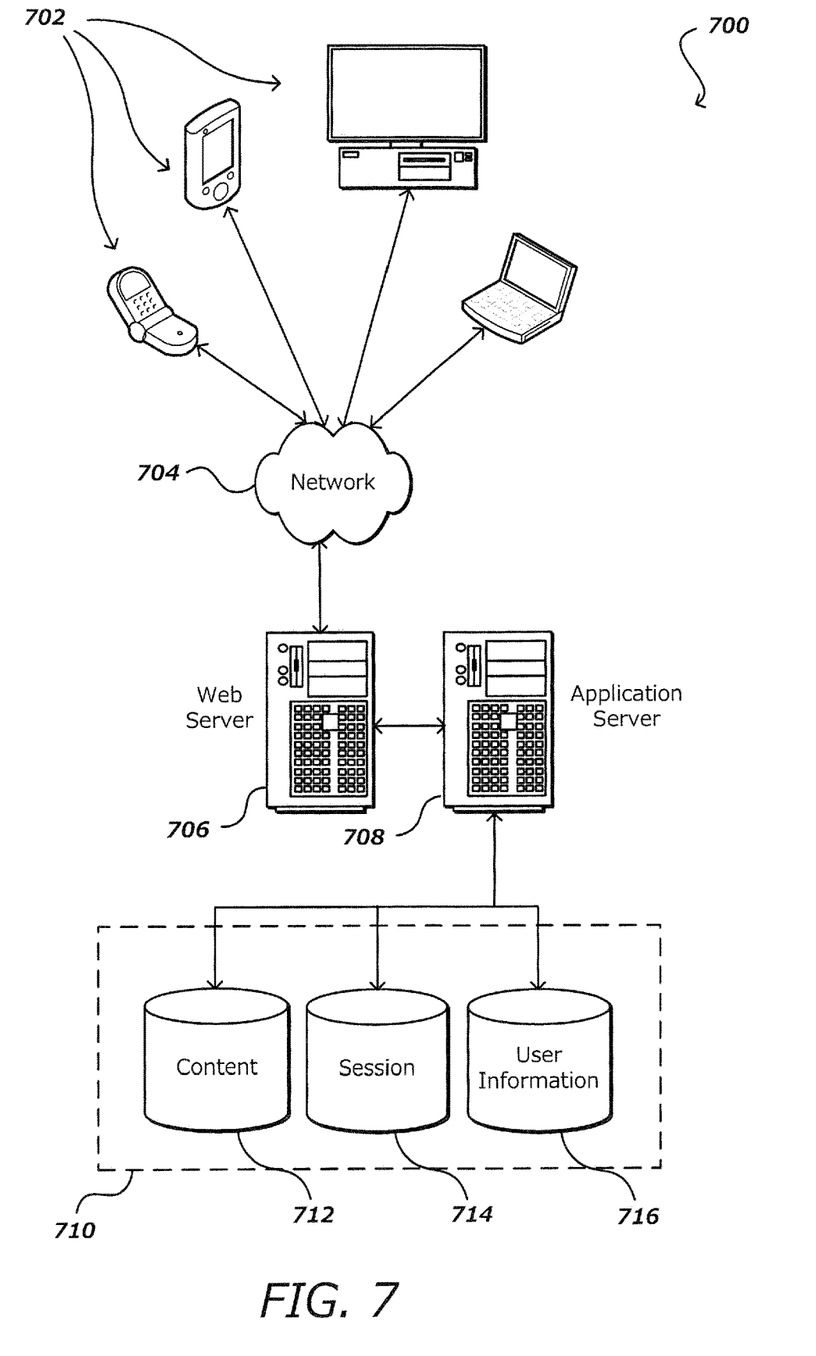
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a first camera having a first field of view;
   a second camera having a second field of view that at least partially overlaps the first field of view;
   a motion sensor;
   at least one memory including instructions that, when executed by the at least one processor, cause the computing device to:
      receive, during a first time period, a first image using the first camera;
      receive, during the first time period, a second image using the second camera;

create motion data using the motion sensor;
determine the motion data indicates first motion of the computing device satisfies a motion condition;
based at least in part on determining the first motion satisfies the motion condition, determine a first quality metric corresponding to the first image;
determine the first quality metric satisfies a threshold quality metric;
based at least in part on determining the first motion satisfies the motion condition, determine a second quality metric corresponding to the second image;
determine the second quality metric satisfies the threshold quality metric;
based at least in part on determining the first quality metric satisfies the threshold quality metric, determine, in the first image, a first representation of a head portion corresponding to a head of a user;
based at least in part on determining the second quality metric satisfies the threshold quality metric, determine, in the second image, a second representation corresponding to the head portion;
determine a third representation of a first facial feature corresponding to the first representation;
determine a fourth representation of the first facial feature corresponding to the second representation;
determine a mapping between the third representation and the fourth representation;
determine at least one calibration parameter based at least in part on the mapping; and
apply the at least one calibration parameter to one or more images received from at least one of the first camera or the second camera during a second time period after the first time period.

2. The computing device of claim 1, wherein the at least one memory further includes instructions that, when executed by the at least one processor, further cause the computing device to:
determine, based at least in part on the mapping, an amount of offset between the third representation and the fourth representation along at least one axis;
determine that the amount of offset satisfies a threshold amount of offset; and
store the mapping.

3. The computing device of claim 1, wherein the at least one memory further includes instructions that, when executed by the at least one processor, further cause the computing device to:
acquire a first set of images using the first camera;
acquire a second set of images using the second camera;
track a first position of the head using the first set of images;
track a second position of the head using the second set of images;
determine, while tracking the first position, a first location of the first representation;
determine, while tracking the second position, a second location of the second representation; and
determine an amount of offset along at least one axis based on at least one of the first position or the second position.

4. The computing device of claim 3, wherein the at least one calibration parameter corrects for at least one of yaw, pitch, or roll misalignment of the first camera and the second camera.

5. A method, comprising:
receiving, during a first time period and from a first camera of a computing device, first image data corresponding to a first plurality of images;
receiving, during the first time period and from a second camera of the computing device, second image data corresponding to a second plurality of images, the first camera and the second camera having partially overlapping fields of view;
creating motion data using a motion sensor;
determining the motion data indicates first motion of the computing device satisfies a motion condition;
based at least in part on determining the first motion satisfies the motion condition, determining a first image, of the first plurality of images, having a first quality metric satisfying a threshold quality metric;
based at least in part on determining the first motion satisfies the motion condition, determining a second image, of the second plurality of images, having a second quality metric satisfying the threshold quality metric;
based at least in part on determining the first quality metric satisfies the threshold quality metric, determining a first representation of a first facial feature in the first image;
based at least in part on determining the second quality metric satisfies the threshold quality metric, determining a second representation of the first facial feature in the second image;
determining, using at least the first representation and the second representation, a misalignment between the first camera and the second camera in at least one dimension;
determining at least one calibration parameter based on the misalignment; and
applying the at least one calibration parameter to one or more images received from at least one of the first camera or the second camera during a second time period after the first time period.

6. The method of claim 5, further comprising:
determining a mapping between the first representation and the second representation; and
determining, based at least in part on the mapping, an amount of offset along at least one axis between the first representation and the second representation.

7. The method of claim 5, wherein determining the at least one calibration parameter comprises:
generating a set of linear equations representing misalignment of the first camera and the second camera in at least one of yaw, pitch, or roll.

8. The method of claim 5, further comprising:
initializing a first homography for the first camera;
initializing a second homography for the second camera;
holding the first homography fixed;
matching the first homography with the second homography; and
using data from the first homography and the second homography to correct for at least one of yaw, pitch, or roll misalignment of the first camera and the second camera.

9. The method of claim 5, further comprising:
determining the at least one calibration parameter based at least in part on at least one of a focal length, a camera lens distortion parameter, or a scale factor principal point parameter.

10. The method of claim 5, wherein:
the first quality metric represents a first amount of light represented in the first image;

the second quality metric represents a second amount of light represented in the second image; and the threshold quality metric corresponds to a threshold amount of light.

11. The method of claim 5, wherein the first facial feature corresponds to at least one of a facial marking, or geometric shapes or distances associated with at least one of a user's eyes, nose, mouth, chin, or ears.

12. The method of claim 5, wherein the at least one calibration parameter corrects for at least one of yaw, pitch, or roll misalignment of the first camera and the second camera.

13. The method of claim 5, further comprising:
determining a mapping between the first representation and the second representation; and
generating a rectifying model based at least in part on the mapping, wherein the rectifying model corresponds to an amount of offset between a first location of the first representation in the first image and a second location of the second representation in the second image.

14. The method of claim 5, further comprising:
receiving a third image using the first camera;
receiving a fourth image using the second camera; and
applying the at least one calibration parameter to construct a three-dimensional image using the third image and the fourth image.

15. The method of claim 5, wherein determining the at least one calibration parameter further comprises:
generating alignment accuracy data based on a first amount of images received; and
determining the at least one calibration parameter further based on the alignment accuracy data.

16. A computing device, comprising:
at least one processor;
a first camera having a first field of view;
a second camera having a second field of view, the first field of view partially overlapping the second field of view;
a motion sensor; and
at least one memory including instructions that, when executed by the at least one processor, cause the computing device to:
receive, during a first time period, a first plurality of images using the first camera;
receive, during the first time period, a second plurality of images using the second camera;
create motion data using the motion sensor;
determine the motion data indicates first motion of the computing device satisfies a motion condition;
based at least in part on determining the first motion satisfies the motion condition, determine a first image, of the first plurality of images, having a first quality metric satisfying a threshold quality metric;
based at least in part on determining the first motion satisfies the motion condition, determine a second image, of the second plurality of images, having a second quality metric satisfying the threshold quality metric;
based at least in part on determining the first quality metric satisfies the threshold quality metric, determine a first representation of a first facial feature in the first image;

based at least in part on determining the second quality metric satisfies the threshold quality metric, determine a second representation of the first facial feature in the second image;
determine, using at least the first representation and the second representation, a misalignment between the first camera and the second camera in at least one dimension;
determine at least one calibration parameter based on the misalignment; and
apply the at least one calibration parameter to one or more images received from at least one of the first camera or the second camera during a second time period after the first time period.

17. The computing device of claim 16, wherein the at least one calibration parameter corrects for at least one of yaw, pitch, or roll misalignment of the first camera and the second camera.

18. The computing device of claim 16, wherein the at least one memory further includes instructions that, when executed by the at least one processor, further cause the computing device to:
generate a set of linear equations representing misalignment of the first camera and the second camera in at least one of yaw, pitch, or roll.

19. The computing device of claim 16, wherein the at least one memory further includes instructions that, when executed by the at least one processor, further cause the computing device to:
initialize a first homography for the first camera;
initialize a second homography for the second camera;
hold the first homography fixed;
match the first homography with the second homography; and
use data from the first homography and the second homography to correct for at least one of yaw, pitch, or roll misalignment of the first camera and the second camera.

20. The method of claim 5, further comprising:
receiving second motion data using the motion sensor; and
determining the second motion data indicates an amount of motion of the computing device below a threshold amount of motion,
wherein the first representation and the second representation are determined based on the amount of motion being below the threshold amount of motion.

21. The method of claim 5, further comprising:
determining at least one of an amount of light of an environment surrounding the computing device or a second motion of the computing device;
selecting the first camera from one of a first stereo camera or a first infrared (IR) camera based on at least one of the amount of light or the second motion; and
selecting the second camera from one of a second stereo camera or a second IR camera based on at least one of the amount of light or the second motion.

22. The method of claim 5, wherein the motion condition corresponds to at least a minimum force.

* * * * *